United States Patent [19]

Westaway

[11] 3,946,384

[45] Mar. 23, 1976

[54] MISSILE GUIDANCE BY RADAR SIGNALS USING SURFACE ACOUSTIC WAVE CORRELATOR

[75] Inventor: Thomas A. Westaway, Provo, Utah

[73] Assignee: The United States of America as represented by the Secretary of the Navy, Washington, D.C.

[22] Filed: Jan. 21, 1971

[21] Appl. No.: 108,653

[52] U.S. Cl............................. 343/7 ED; 244/3.14
[51] Int. Cl.² .......................................... G01S 9/02
[58] Field of Search .......... 343/7 ED, 7 A; 244/3.14

[56] References Cited
UNITED STATES PATENTS

| | | | |
|---|---|---|---|
| 2,594,305 | 4/1952 | Houen | 244/3.14 |
| 2,645,771 | 7/1953 | Labin | 244/3.14 |
| 2,709,773 | 5/1955 | Getting et al. | 343/7 A |

OTHER PUBLICATIONS

Skolnik, Radar Handbook, McGraw-Hill Inc., 1970, pp. 20-22 to 20-29.

Primary Examiner—Maynard R. Wilbur
Assistant Examiner—G. E. Montone
Attorney, Agent, or Firm—R. S. Sciascia; R. F. Beers; P. Schneider

[57] ABSTRACT

A system for controlling the flight of a missile by the use of coded radar signals. A ground level radar transmits coded signals in the form of a phase modulated radar signal. Each coded signal represents a particular guidance command which is received by the missile and "filtered" out of the radar signal by a surface acoustic wave correlator. The correlator detects the code in the signal and in turn energizes a control circuit which operates a control surface on the missile.

4 Claims, 4 Drawing Figures

INVENTOR.
THOMAS A. WESTAWAY
BY Thomas O. Watson Jr.

ATTORNEY

MISSILE GUIDANCE BY RADAR SIGNALS USING SURFACE ACOUSTIC WAVE CORRELATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to guidance systems for controlling missiles and more particularly relates to the use of radar equipment to provide the guidance commands. The use of radar transmitting equipment permits controlling a vehicle by the same means by which it is detected. The invention is concerned with providing two or more functions in one frequency band on a non-interfering basis with the result that precious frequency space will be available for other uses.

The idea of command guidance is not new. For example radio controlled missiles, drones, etc., are well known in the art. Likewise, the use of radar signals to provide command guidance is not new. The advantage of using radar signals for command guidance is that it is difficult for any enemy to know when guidance signals are being given or to know what the guidance commands are. By adding pulse to pulse frequency diversity and prf jitter to the radar signal, it becomes even more difficult for the enemy to deceive a missile guidance circuit or to know what part of the frequency spectrum to jam. Present guidance systems have a disadvantage in that they use either two completely separate systems which transmit two different types of signals or the two separate systems transmit signals at different frequencies thus using up a substantial portion of the frequency spectrum available. For example, one system uses pulse radar to guide the missile while using a CW illuminating radar to track the target while another system uses a doppler radar along with a pulse radar to provide guidance to the missile. These systems are necessarily complicated and expensive.

SUMMARY OF THE INVENTION

This invention is a system and a method of achieving covert command guidance of missiles using a phase modulated radar signal as the guidance command. The command guidance link could be used to control surveillance vehicles such as DASH or SNOOPY or it could be used to guide a missile such as Bullpup or Shrike to its target. A ground level radar system transmits coded radar signals to the missile which are decoded and used to operate control surfaces on the missile. The coding and decoding functions are performed by surface acoustic wave correlators. Surface acoustic wave correlators provide the unique functions of cross-correlating a signal stored in the correlator with the incoming command guidance signal. The correlator contains a stored replica of a command signal. When that particular command signal is received the device produces the cross-correlation function for that wave form. When any other command is received a response will occur, but it will not be a correlation response. That is, its amplitude will be less than the response for the proper command signal. Digital deciphering circuits follow the acoustic wave devices and determine which device produced the response and thus what the particular command is. The command is then fed into the control circuits of the missile which in turn operate control surfaces.

OBJECTS OF THE INVENTION

It is an object of the present invention to provide a system which achieves covert command guidance of a missile using phase modulated radar signals.

It is a further object of the invention to provide such a system which also conserves precious frequency space.

Still another object is to provide command guidance while improving the signal to noise ratio of the ground level radar.

Other objects, advantages and features of the invention will become apparent from the following detailed description of the invention when considered in conjunction with the accompanying drawings.

DETAILED DESCRIPTION OF THE PREFERRED EMBODIMENT

Figure 1:
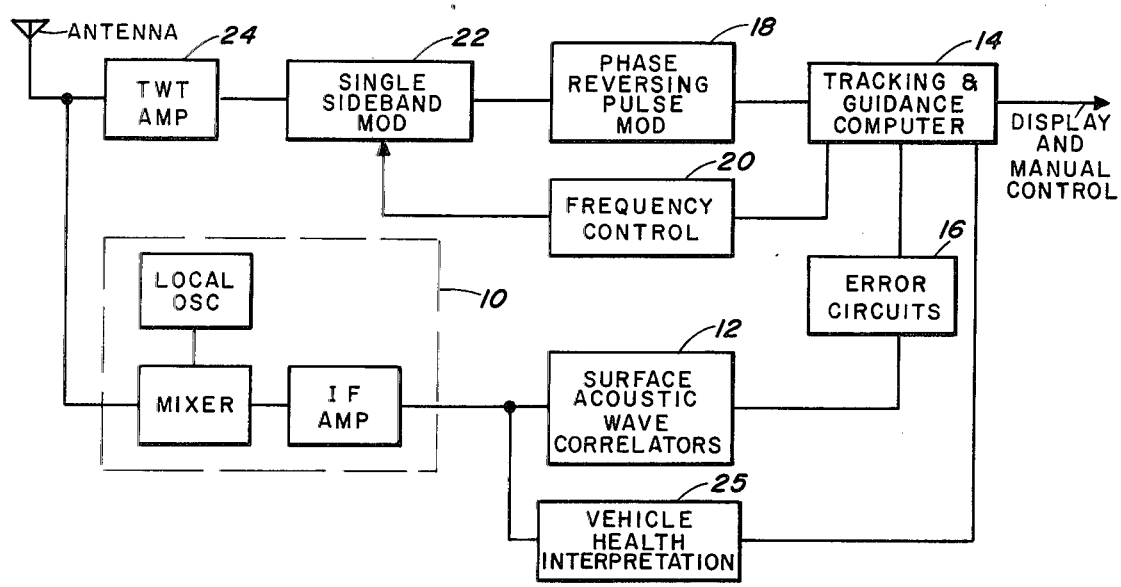
FIG. 1 shows a simplified block diagram of the basic radar system needed to achieve command guidance.

A basic radar system needed to achieve command guidance is illustrated in FIG. 1. The system may be a multi-track radar using a phased array antenna to track multiple targets; it could also be a search radar for use with a surveillance vehicle, or the system could consist of two tracking radars, one for the target and one for the missile. Preferably the radar system chosen for missile guidance uses a traveling wave tube (TWT) or a cross-field amplifier for transmission. The use of phase modulated or phase coded pulses for missile guidance dictates the need for a radar system which produces a minimum of distortion.

Tracking information is processed by a conventional radar receiver 10 and fed to a plurality of parallel connected surface acoustic wave correlators 12. The surface acoustic wave correlators perform two functions. They act as a signal coding device to provide information to the computer 14 through error circuits 16 to determine the guidance commands to be given by the computer. They also perform the function of improving signal to noise ratio and discriminate against other interfering signals (deliberate or unintentional).

The guidance commands from the computer 14 determine the phase reversal modulated signal to be generated by the phase reversal pulse modulator 18. This phase modulated IF signal is applied to a single side band modulator 22 which translates the signal to the frequency of transmission. The radar computer 14 also determines on which frequency the radar is to transmit from pulse to pulse by operating frequency control device 20. Frequency control device 20 is a conventional frequency synthesizer having a selectable frequency and a frequency multiplier. The output of the single side band modulator 22 is applied to the TWT transmitter 24 which amplifies the signal to the proper power level for transmission. The guidance signal transmitted also provides a radar return that can be processed by the receiver circuits 10 to provide raw tracking information for the computer.

Figure 2:
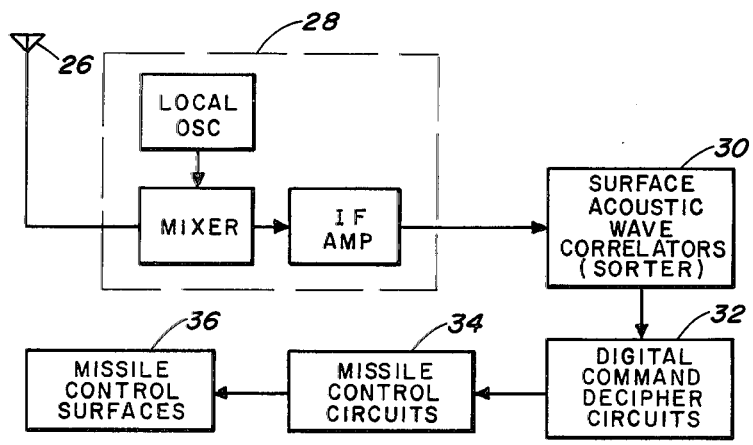
FIG. 2 shows a simplified block diagram of a receiver similar to the radar receiver which is installed in the missile.

On board the missile or surveillance vehicle is a wide angle antenna 26 pointed toward the radar transmitter and a microwave receiver 28 similar to the radar receiver. A block diagram of this receiver is shown in FIG. 2. The phase modulated IF pulse is received by the wide angle antenna 26 and applied to a conventional radar microwave receiver 28. The output of receiver 28 is processed by a plurality of parallel connected surface acoustic wave correlators 30 which act as matched filters to the phase modulated radar pulse. Each surface acoustic wave correlator on board the vehicle is matched to a different modulated pulse. A family of modulated pulses is chosen so that only one of the correlator outputs will exceed a certain level in response to the received command. This is accomplished by designing each acoustic correlator to respond to only one particular phase coded pulse. A digital command decipher circuit 32 determines which correlator responded to the command, thus determining what the command was, and produces the proper output signal to the missile control circuits 34. The missile control circuits 34 in turn operate one of the missile control surfaces 36.

If it is desired to obtain health information from a missile one of the surface acoustic wave correlators could be provided for this purpose. If one of the commands from the ground level radar is to transmit health information, a transmitter (not shown) would be provided with a local oscillator at a different frequency so that the receiver frequency would not be revealed when the vehicle responds. In addition the ground level radar of FIG. 1 would include a vehicle health interpretation circuit 25 which would supply information to the radar computer to determine if the missile is functioning properly.

The surface acoustic wave correlators are the heart of the system, for they detect and sort out the particular command from the radar signal received. They accomplish this function by performing cross-correlation on the receiver radar signal. That is, a surface acoustic wave correlator contains a stored replica of a particular command signal and when that command signal is received, the device forms a cross-correlation function for that wave form. When any other command signal is received, a response will occur, but it will not be a correlation response (i.e., its amplitude will be less than the response for the proper command signal). In this sense, the acoustic wave device is the heart of the command detection receiver. However, the acoustic wave device only performs the function of cross-correlation. The digital command decipher circuits that receive the output from the acoustic correlators determine whether the response of an acoustic wave device indicates a positive correlation or negative correlation (i.e., whether a signal is a specified command or not). When no guidance commands are being transmitted none of the acoustic wave correlators will provide a correlated response and thus the missile will remain on its present course.

Figure 3:
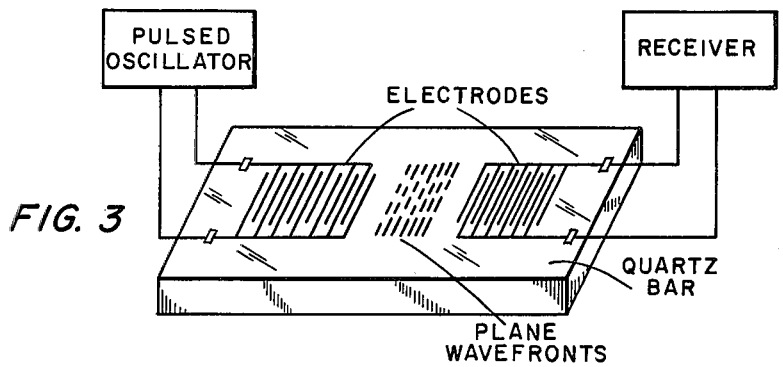
FIG. 3 illustrates the electrode structure which experimentally demonstrated correlation in piezoelectric materials.

A surface acoustic wave correlator is a piezoelectric device which has specially designed electrodes for accomplishing correlation with a phase coded signal. Experiments by R. H. White and F. W. Voltmer demonstrated that acoustic Rayleigh waves can be excited electrically in piezoelectric materials. (Rayleigh waves are named for their discover who showed that waves could be propagated on the plane boundary of a solid elastic material and air or vacuum.) White and Voltmer showed that correlation could be performed with these acoustic surface waves and a proper "receiving" electrode structure. In one experiment they impulsed a "transmit" electrode structure that consisted of several pairs of electrodes placed perpendicular to the digonal axis of AT cut quartz. The "receiving" electrode structure was identical to the "transmit" electrode structure as shown in FIG. 3. (Their experiments are reported in Applied Physics Letters, volume 7, number 12, Dec. 15, 1965, pages 314 to 316.) The acoustic wave produced when the "transmit" electrode was inpulsed was a rectangular pulse. When this pulse was intercepted by the "receive" electrodes, a diamond shaped output wave form was noted on the oscilloscope. A correlation function or a rectangular pulse correlated with a rectangular pulse of the same duration is a diamond shaped wave form.

Figure 4:
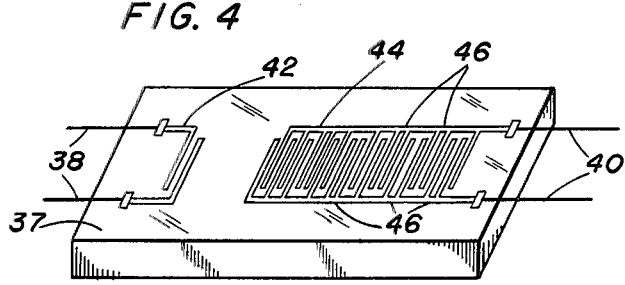
FIG. 4 illustrates the electrode structure to correlate a phase reversal modulated pulse.

These experiments led to the development of the surface wave acoustic correlators used in the present invention. FIG. 4 illustrates a typical electrode structure for correlation. The electrode pattern 42, 44 is produced by photoetching a metallic film deposited on quartz bar 37. The input electrode 42 consists of a single pair while the output electrode structure consists of coded pairs of electrodes. The output electrodes are coded by built-in phase changes in the electrode structure as shown in 46. These phase changes in the electrode structure correspond to phase changes in the phase reversal modulated pulse. Correlation of a 10 microsecond phase coded pulse require a quartz crystal approximately 2 inches long and ½ inch wide. Phase coded radar signals are applied to the input electrodes at 38 producing a correlated wave form at the output 40. The deciphering circuits 32 of FIG. 2 determine whether a correlation response has occurred.

Thus there has been disclosed an invention which controls the flight of a missile by using coded radar pulses which result in a conservation of precious frequency space. The use of surface wave acoustic correlators in the basic radar system to achieve command guidance also provides the additional advantage of improved signal to noise ratio enabling the radar to discriminate against other interfering signals.

Obviously many modifications and variations of the present invention are possible in the light of the above teachings. It is therefor to be understood that within the scope of the appended claims the invention may be practiced otherwise than as specifically described.

What is claimed is:

1. A remote control system for guiding a missile comprising:
    a radar system including means for transmitting phase-coded command signals, one phase-coded signal for each command;
    means installed in the missile for receiving said command signals;
    means for decoding the command signal,
    said decoding means comprising a plurality of surface-acoustic-wave correlators, one correlator for each command signal, and means for deciphering the output of the correlators to determine which of the correlators produced a response; and,
    means for operating a control surface on the missile in response to the decoded command signal.

2. The control system of claim 1 wherein said transmitting means includes: a phase reversal pulse modulator for generating the phase coded command signals; and signal coding means for energizing said pulse modulator, one signal coding means for each command signal.

3. The control system of claim 2 wherein the signal coding means is comprised of a plurality of surface wave acoustic correlators.

4. The control system of claim 1 wherein the radar system includes means for receiving part of the command signal energy which is reflected by the missile and for producing missile position information.